Patented July 3, 1928.

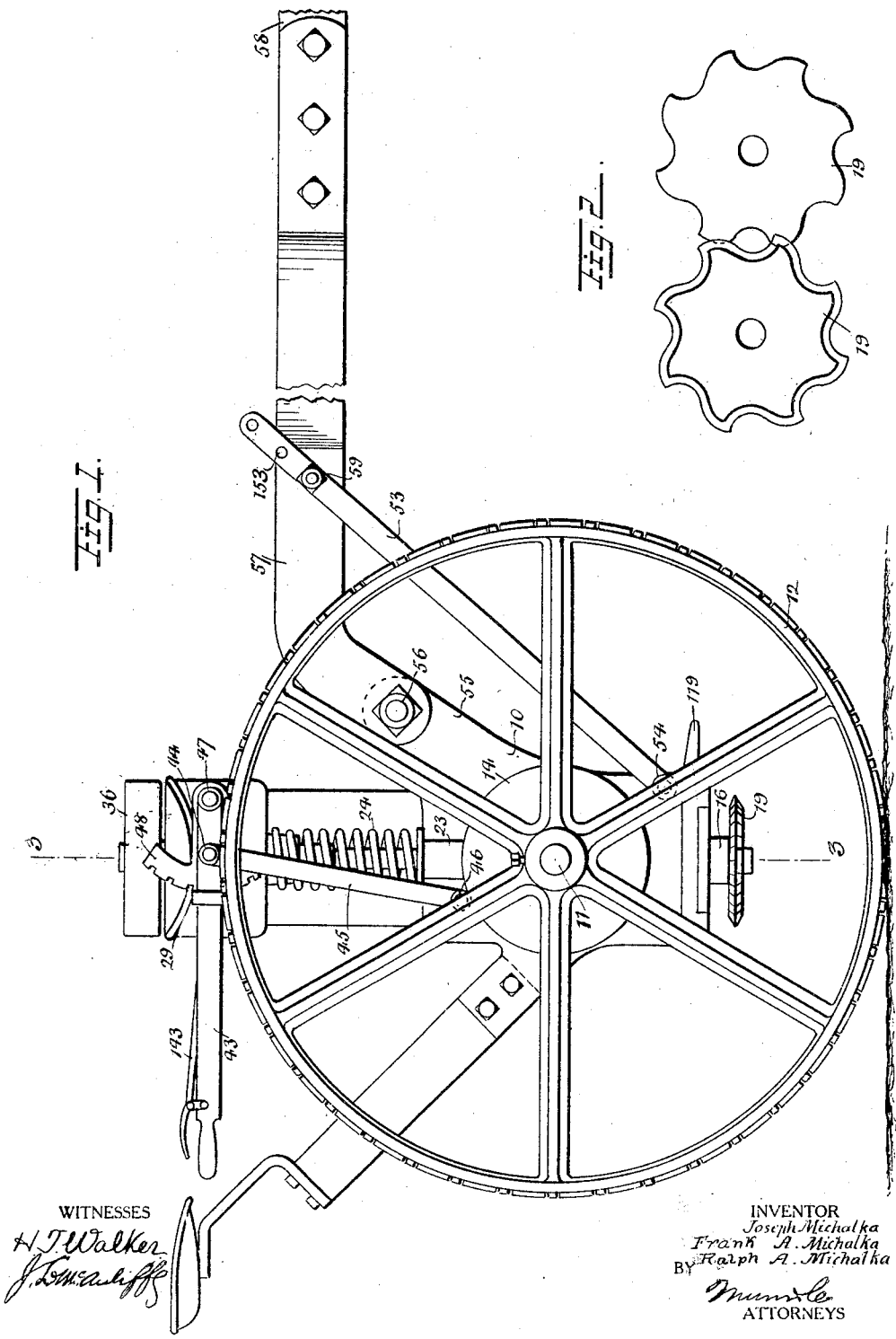

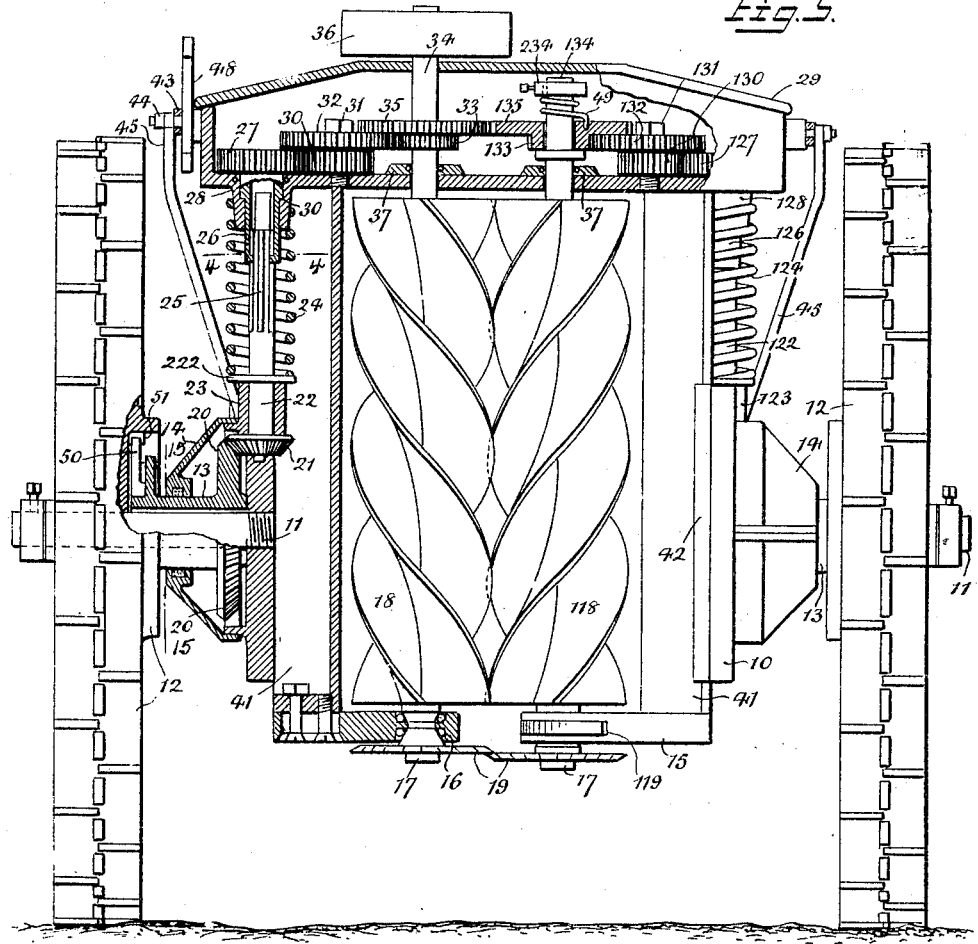

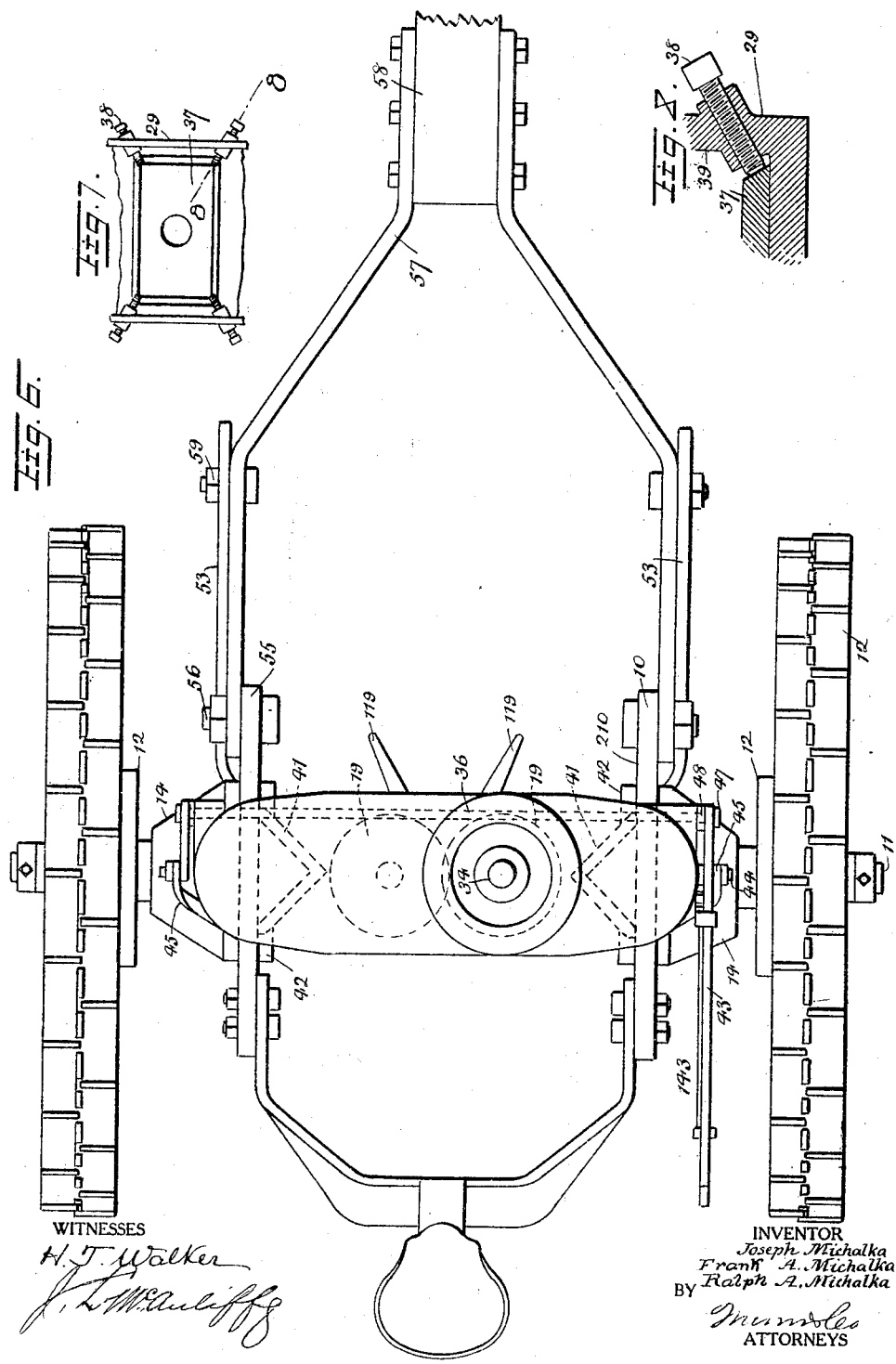

1,676,105

UNITED STATES PATENT OFFICE.

JOSEPH MICHALKA, FRANK A. MICHALKA, AND RALPH A. MICHALKA, OF CAMERON, TEXAS.

STALK CUTTER.

Application filed January 9, 1925. Serial No. 1,438.

Our invention relates to a wheeled stalk cutter adapted to be drawn over a field to cause the stalks to be cut up in predetermined small lengths as the machine travels.

The general objects of our invention are to provide a wheeled stalk cutter improved with respect to the chopper and severing knives and means to maintain the knives in proper cutting relation to each other; to provide novel-drive means between the traction wheels and the cutters, and means to make or break the driving connection with the cutters; and to provide means whereby to tilt the knife frame and to give the severing knives a forward and downward inclination for the effective severing of stalks of certain character.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of a stalk cutter embodying our invention;

Figure 2 is a plan view of the pair of stalk severing knives;

Figure 3 is a view of the stalk cutter partly in section and partly in front elevation;

Figure 4 is an enlarged view in horizontal section of a detail of the drive means for the chopping knives to be hereinafter referred to;

Figure 5 is an enlarged sectional elevation of the clutch means on the axle to operate the drive means;

Figure 5ᵃ is a detail in vertical section taken at the upper end of one of the drive shafts.

Figure 6 is a plan view of the stalk cutter;

Figure 7 is an enlarged plan view of the means for adjusting the shafts of the chopping knives relative to each other to maintain the proper engagement of the knives with each other;

Figure 8 is a detail in vertical section of a portion of the shaft adjusting means shown in Figure 7.

In carrying out our invention in accordance with the illustrated example, a suitable frame designated generally by the numeral 10 is employed. To fixed frame parts stud axles 11 are secured mounting the wheels 12, said axles passing through hubs 13 on the wheels, there being suitable dust caps 14 on the hubs constituting gear boxings or housings as will appear.

On members 15 at the bottom of the frame 10 are provided suitable bearings 16 to constitute step bearings or thrust bearings for the lower journals 17 of the pair of spiral chopping knives 18 and 118 turning about axes vertical or approximately so according to the work to be done as hereinafter referred to. On the journals 17 are severing knives 19 shown in Figure 2 and overlapping. Adjacent to the severing knives 19 and extending forwardly thereof are horns 119 to gather the stalks and direct them to the chopping knives 18 and 118. It is to be noted that the spiral chopping knives are disposed vertically or approximately so at all times for the efficient reception and chopping of the stalks.

For driving the chopper knives 18 and 118 and the severing knives 19, the following means is employed at each side of the machine. A bevel gear 20 turns with the hub 13 and meshes with a bevel pinion 21 on one vertical shaft 22 which turns in a fixed bearing 23. A spring 24 is coiled about the shaft 22 and acts against a dust collar 222 on said shaft above bearing 23. The upper portion of shaft 22 has splines 25 thereon (Figures 3 and 4) and said splines engage corresponding grooves in the lower zone of a hub 26 rigid with a spur gear 27, said hub 26 having a bearing in a depending boss 28 on a gear box 29 on the knife frame at the top.

By lifting the gear box 29 and with it the knife frame as hereinafter explained, the splines 25 pass out of engagement with the grooves at the lower end of the hub 26 thereby disengaging the driving connection between shaft 22 and the gear 27 of the gear train next described.

The pinion 27 meshes with a pinion 30 on a shaft 31, said shaft having a second pinion 32 meshing with a pinion 33 on the shaft 34 of one spiral chopping knife 18. The shaft 34 has a gear wheel 35 meshing with a corresponding gear wheel 135 on the shaft 134 of the second spiral chopping knife 118. Again, a shaft 122 at the opposite side drives a pinion 127 meshing with a pinion 130 on a shaft 131 which shaft has a second pinion 132 meshing with a pinion 133 rigid with the gear wheel 135.

It will be seen that the described gear train is the same at each side of the machine. The shaft 122 turns in a fixed bearing 123 and has coiled about the same a spring 124 corresponding with the spring 24. The numeral 126 indicates the hub of gear wheel 127 corresponding with the hub 26 of the gear wheel 27 and the numeral 128 indicates the bearing boss corresponding with the bearing boss 28.

A flywheel 36 is provided on the shaft 34 and has particular usefulness when the machine is used for cutting heavy stalks.

The shafts 34 and 134 pass freely through the bottom of gear box 29 surrounding the gear trains referred to and said shafts pass through bearing plates 37 on the inner side of said bottom of the gear box, see Figures 3, 7 and 8. The bearing plates 37 are adjustably held by set screws 38 passing through the side 39 of gear box 29 and engaging said plates 37 at the corners.

The frame elements 15 are in fixed relation to the gear box 29 and vertical guards 41 are provided as part of the knife frame and integral with the gear box 29, said guards being disposed at the outer sides of the chopper knives 18. The structure including the frame elements 15, 29 and 41 is adapted to be moved vertically in side guides on the frame 10, said guides being formed by vertical gibs 42. For raising and lowering gear box 29 and thereby making and breaking the drive connection between the shafts 22, 122 and the hubs 26, 126 of the drive gears, 27, 127, a lever 43 is conveniently positioned adjacent said gear box and is fulcrumed as at 44 on the upper end of a link 45, the lower end of which is secured as at 46 to frame 10 adjacent one of the dust caps 14. The end of the lever 43 has a pivotal connection as at 47 with the gear box 29 so that upon said lever being rocked downwardly about the axis of its fulcrum 44, the gear box 29 will be raised. The numeral 48 indicates a rack to be engaged by the latch 143 of lever 43.

A torsion spring 49 is coiled about the shaft 134 above the gear wheel 135 and is made fast at one end to said gear wheel 135, the upper end of said spring 49 being made fast to a set collar 234 on shaft 134.

Referring to the two groups of gearing 27 to 35 and 127 to 135 and keeping in view the spring 29, as well as the shopping knives 18 and 118, the operation is as follows:

If the drive is from that wheel 12 at the left of Figure 3, the pinion 21 and shaft 22 will turn the wheel 27 of the train and through the intermediate gears will drive the chopper knife 18. If the drive be from that running wheel shown at the right of Figure 3, then the drive will be from shaft 122 to gear 127 and through the intermediate gear elements to the gear element 135. Said gear element 135 being directly in mesh with gear wheel 35 will drive said gear wheel 35 and the integral pinion 33 and drive the shaft 34 and its chopping knife 18. The chopping knife 118 is driven by contact with the chopping knife 18. The spring 49 takes care of any back lash of the chopping knife 118 and its shaft 134 with respect to the knife 18 and will always restore knife 118 after any back lash and therefore said spring 49 will serve to maintain the chopping knives 18 and 118 for the driving of chopping knife 118 by contact with the knife 18.

The illustrated clutch means for turning the gear wheel 20 with the turning of wheel 12 and its hub 13 is shown in Figure 5 and consists of clutch pawls 50 adapted to engage ratchet teeth 51 at the interior of the hub of adjacent running wheel 12. The pawls 50 are subject to springs 52 which permit the pawls to slip over the ratchet teeth when running wheel 12 is turned backward with the backing of the vehicle.

In order that the frame, chopper knives 18, 118, the severing knives 19 and horns 119 may be tilted forwardly from a vertical plane about the axis of the wheel axles as a center, for picking up and chopping corn stalks, we provide an adjusting bar 53 at each side of the frame. Each bar 53 is pivotally secured at its lower end as at 54 to the frame. Frame 10 has an arm 55 at each side and extending obliquely in a forward direction. The two side arms 55 are pivotally secured by bolts 56 to the rear ends of the hounds 57 or tongue 58. The adjusting bars 53 extend obliquely in a forward direction and are formed with series of bolt holes 153 through either of which holes may be passed a bolt 59. In Figure 1 the frame is shown vertical and the bolt 59 in that hole 153 of bar 53 for maintaining the frame vertical. The bolt 59 may be shifted to either of the other bolt holes 153, so that the frame will be held tilted forwardly with the severing knives 19 and horns 20 inclining downwardly and forforwardly.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. A stalk cutter including a wheeled frame, vertically disposed guide means on said frame, a knife frame vertically movable in said guide means, rotary chopper knives in said knife frame, shafts for said knives, vertical shafts at the outer sides of the knife frame, means to turn said second shafts with the turning of the wheels of the first frame, gear trains on said knife frame for effecting a driving connection between said second shafts and the shafts of the chopper knives, means to raise and lower said knife frame, and means to make and break the drive connection between said shafts and the initial elements of the drive trains with the raising and lowering of the knife frame.

2. A stalk cutter including a wheeled frame, vertically disposed guide means on said frame, a knife frame vertically movable in said guide means, rotary chopper knives in said knife frame, shafts for said knives, vertical shafts at the outer sides of the knife frame, means to turn said second shafts with the turning of the wheels of the first frame, gear trains on said knife frame for effecting a driving connection between said second shafts and the shafts of the chopper knives, means to raise and lower said knife frame, splines on the shafts, hubs on the initial elements of the gear trains, said hubs slidably engaging the shafts and their splines, whereby with the raising and lowering of the knife frame the drive connection between said hubs and said shafts will be disestablished or established.

3. A stalk cutter including a wheeled frame, a knife frame mounted for up and down movement in the first frame, chopper knives in said knife frame, means to drive said knives by the turning of the wheels of the first frame, and means to raise and lower said knife frame; together with means to make and break the drive connection with the lowering and raising of the knife frame.

4. A stalk cutter including a wheeled frame, a knife frame mounted for up and down movement in the first frame, chopper knives in said knife frame, shafts for said knives, a gear box in which said shafts extend, gear trains associated with the respective knife shafts, means to actuate said gear trains with the turning of the wheels of the first frame, and plates in the gear box affording bearings for the knife shafts, said plates being adjustable transversely of the axes of said shafts.

5. A stalk cutter including a wheeled frame, chopper knives in said frame, gear trains to drive the respective knives by the turning of the wheels of said frame, said gear trains comprising gear elements on the shafts of said chopper knives and intermeshing with each other, and a torsion spring coiled about one of said shafts and having connection therewith at one end, the opposite end of said spring being secured to one of said intermeshing gear elements.

6. A stalk cutter including a wheeled frame, a shaft in said frame, a spiral chopper knife rigid with said shaft, means to drive said shaft from one of the running wheels of the stalk cutter, said drive means including a gear element rigid with said shaft, a second shaft, a spiral chopping knife rigid with said second shaft and in contact with the first chopping knife, a gear train driven by the second running wheel of the stalk cutter and including a gear element loose on said second shaft and meshing with the gearing element fast on the first shaft, and a torsion spring forming a connection between said loose gear element and the second shaft.

7. A stalk cutter including a frame, running wheels, a chopper knife, a shaft mounted in said frame and mounting said chopper knife, gear trains driven respectively from the respective running wheels, said gear trains both in driving relation to said chopper knife shaft and in driving connection one with the other, a second shaft, and a second chopper knife mounted on said second shaft, and co-acting with the first chopper knife, said first chopper knife having driving contact with the said second chopper knife to turn the latter.

8. A stalk cutter including a frame, running wheels, a chopper knife, a shaft mounted in said frame and mounting said chopper knife, gear trains driven respectively from the respective running wheels, said gear trains both in driving relation to said chopper knife shaft and in driving connection one with the other, a second shaft, and a second chopper knife mounted on said second shaft and co-acting with the first chopper knife and driven thereby; together with a torsion spring forming a connection between the shaft of the second-mentioned chopper knife and an element of one of the gear trains.

9. A stalk cutter including a wheeled frame adapted to travel over a field, vertical chopping knives revolubly mounted in said frame, and means to drive one of said knives, the second knife being in frictional engagement with the driven knife to be driven thereby.

10. A stalk cutter including a wheeled frame adapted to travel over a field, revolubly mounted spiral knives disposed approximately vertical in said frame and in contact with each other, and means to drive one of said knives so that the other will be driven by the engagement with the driven knife.

JOSEPH MICHALKA.
FRANK A. MICHALKA.
RALPH A. MICHALKA.